United States Patent
Henderson et al.

(10) Patent No.: US 9,903,783 B2
(45) Date of Patent: Feb. 27, 2018

(54) TRANSPORTABLE HOSE-TEST CONTAINERS, SYSTEMS AND METHODS

(71) Applicant: GATES CORPORATION, Denver, CO (US)

(72) Inventors: Kim Henderson, Castle Pines North, CO (US); Andy Hills, St. Neots (GB); Jonathan Clark Swift, Cambridge (GB); Robert Clifford Edlund, Singapore (SG)

(73) Assignee: GATES CORPORATION, Denver, CO (US)

( * ) Notice: Subject to any disclaimer, the term of this patent is extended or adjusted under 35 U.S.C. 154(b) by 259 days.

(21) Appl. No.: 14/675,205

(22) Filed: Mar. 31, 2015

(65) Prior Publication Data
US 2015/0204754 A1    Jul. 23, 2015

Related U.S. Application Data

(63) Continuation of application No. PCT/US2013/062876, filed on Oct. 1, 2013.
(Continued)

(51) Int. Cl.
*G01M 3/26* (2006.01)
*G01M 3/28* (2006.01)

(52) U.S. Cl.
CPC ............ *G01M 3/26* (2013.01); *G01M 3/2815* (2013.01); *G01M 3/2846* (2013.01)

(58) Field of Classification Search
CPC ........ G01M 3/2846; G01M 3/02; G01M 3/26; G01M 3/2815
See application file for complete search history.

(56) References Cited

U.S. PATENT DOCUMENTS 3,436,957 A * 4/1969 Pridy .................. G01M 3/2853
137/115.16
3,710,628 A    1/1973 Horton
(Continued)

FOREIGN PATENT DOCUMENTS

CN    201053926 Y    4/2008
CN    201561902 U    8/2010
(Continued)

OTHER PUBLICATIONS

Japanese Patent Office, Office Action Japanese application No. 2015-535738, dated Apr. 8, 2016.
(Continued)

*Primary Examiner* — Natalie Huls
(74) *Attorney, Agent, or Firm* — Paul N. Dunlap, Esq.; Jeffrey A. Thurnau, Esq.

(57) ABSTRACT

A transportable test system having a control room module, a first IMR test module, and a second IMR test module. The test modules may have fasteners that permit assembly into a unitary package of predetermined overall dimension (i.e. size and shape) such as a standard shipping container dimension. A first IMR test module may have a clean fluid provider and/or supply reservoir, and a second IMR test module may have a used fluid collector and/or collection reservoir. The system may include pressurization, hose restraint, fluid containment, module stabilization/mobilization, lifting, cleaning, and control subsystems.

30 Claims, 7 Drawing Sheets

Related U.S. Application Data

(60) Provisional application No. 61/709,983, filed on Oct. 4, 2012.

(56) References Cited

U.S. PATENT DOCUMENTS

| | | | |
|---|---|---|---|
| 3,810,383 A | | 5/1974 | Matherne |
| 4,156,436 A | * | 5/1979 | Hawk ................... E02F 9/2275 137/355.17 |
| 4,470,259 A | | 9/1984 | Miller et al. |
| 4,470,295 A | | 9/1984 | Pounds et al. |
| 4,858,464 A | * | 8/1989 | Miller ................. G01M 3/2846 73/49.5 |
| 5,587,521 A | | 12/1996 | Lanasa |
| 7,827,860 B2 | | 11/2010 | Weis |
| 7,975,935 B2 | | 7/2011 | Matheis, Jr. |
| 8,033,299 B2 | | 10/2011 | Buckner et al. |
| 8,200,737 B2 | | 6/2012 | Tarabzouni et al. |
| 2005/0218075 A1 | | 10/2005 | Graetz et al. |
| 2008/0053992 A1 | | 3/2008 | DeBord |
| 2008/0267819 A1 | | 10/2008 | Bacik et al. |
| 2009/0248324 A1 | * | 10/2009 | Hamilton ............... A62C 37/50 702/47 |
| 2011/0041415 A1 | | 2/2011 | Esposito |
| 2011/0178736 A1 | * | 7/2011 | Westra ................. G01M 3/2815 702/50 |

FOREIGN PATENT DOCUMENTS

| | | |
|---|---|---|
| DE | 20309228 U1 | 12/2003 |
| GB | 2476299 A | 6/2011 |
| JP | 08021781 A | 1/1996 |
| SU | 1711008 A1 | 2/1992 |
| WO | 2011084096 A1 | 7/2011 |

OTHER PUBLICATIONS

Federal Service for Intellectual Property (Rospatent); Decision of Grant; dated Sep. 9, 2016; pp. 1-5, Moscow, Russia The procedure manual of organization and order of fire line maintenance, approved by the Ministry of Emergency of the Russian Federation, 2007, published in 2008, Section "3.4.2. Special aspects of Servicing" (sub-sections 3.4.2.2-3.4.2.4); Moscow, Russia.

European Patent Office, International Search Report PCT Application No. PCT/US2013/062876, dated Aug. 28, 2014.

Russian Patent Office, Office Action Russian application No. 2015116809, dated Jun. 17, 2016.

* cited by examiner

TRANSPORTABLE HOSE-TEST CONTAINERS, SYSTEMS AND METHODS

BACKGROUND OF THE INVENTION

This invention relates generally to transportable container-based systems for field testing hydraulic hose.

In recent years, improved safety practices in the oil and gas industry have required oil rig operators to recertify critical equipment. There are now industry guidelines from organizations like 'Oil and Gas UK' which companies need to follow in order to demonstrate industry best practice. One part of these best practices relates to the recertification of critical hoses. Current practice involves pressurizing the hose to be recertified to a specified pressure and duration determined by the manufacturer's guidelines. The hoses are held at pressure for a specified amount of time, which can be as short as under 20 minutes or as long as 24 hours or more. The hoses are monitored continuously while they are pressurized. Hoses are failed or taken out of service if they are not able to hold pressure for the amount of time specified by the manufacturer.

Current practices include laying pressurized hose on the ground for extended periods of time, which may expose personnel to unsafe conditions. Hose bursts may be dangerous to personnel or equipment. The hoses are cleaned, and the cleaning fluids may be environmentally hazardous.

What is needed is hose test systems and methods with improved safety, mobility or transportability, and efficiency.

SUMMARY

The present invention is directed to systems and methods which facilitate inspection, maintenance, and recertification of hoses with improved portability, safety, and efficiency.

The invention is directed to a transportable test system having a control room module, a first IMR test module, and a second IMR test module. The test modules may have fasteners that permit assembly into a unitary package of predetermined overall dimension (i.e. size and shape). A first IMR test module may have a clean fluid provider and/or supply reservoir, and a second IMR test module may have a used fluid collector and/or collection reservoir.

The transportable test system may have a predetermined overall dimension (i.e. size and shape) which is that of a standard shipping container. The unitary package may have an external lifting interface for moving and/or securing. The interface could be one or more selected from a padeye, a shackle, a fork pocket, a tugger point, and a complete lifting set.

The transportable test system may further include a hose pressurization subsystem which may include a compressor or pump for pressurizing, filtration apparatus, hook ups and/or manifolds for connecting the test hose(s), and it may be housed in one or more of said modules.

The transportable test system may further include a cleaning subsystem which can include pump, filter, hose, nozzle, and may be for example, a power washer. The cleaning subsystem can be housed in one of the modules for transport of the system.

The transportable test system may further include a fluid containment subsystem. For example, the IMR test modules include fluid collection apparatus, reservoir, etc. The collection subsystem may include hose test stands, blanket (flexible channel), drain, etc. Stands may be of varying and/or adjustable height and/or shape to facilitate flow of fluid runoff toward the fluid collection apparatus and collection reservoir located in an IMR test module.

The transportable test system may further include a hose lifting subsystem which can include crane(s), test stands, etc. These may be housed in and/or mounted on one or both of the IMR test modules.

The mobile test system may further include a hose restraint subsystem which can include shackles, tethers, chains, and/or other anti-whip or whip-check devices for hose ends and/or for the hose length and can include use of the lifting frame to restrain and/or support the hose.

The transportable test system may further include a control system housed in said control room module and adapted to implement a predetermined test protocol including carrying out a hose pressurization schedule, leak detection, and test report generation. The control system can implement any desired test protocol including ramp rate, duration, max P (e.g. 120% of working pressure), pressure decay monitoring, etc.). The system can optionally include an ultrasonic tube tester or other non-destructive test equipment. The control system may be a computer-based system with digital storage, display, printouts and the like.

The transportable test system modules may each be of a standard shipping container size. For example, the package dimensions may be that of a 20-foot shipping container, and the IMR test modules may be ½-height containers (¼ the size of a 20-foot container) and the control module may be a 10-foot container size (i.e. ½ the size of a 20-foot container). The containers may be transported individually or combined in various sized container packages.

The transportable test system may include on each of the IMR test modules a stabilizer subsystem and a mobilizer subsystem, or a combination stabilizer/mobilizer subsystem. This may for example include extendable legs with leveling jacks and wheels or casters.

The transportable test system may further include a frame that facilitates assembly of the modules into a unitary package, including attachment sites for lifting the package as a unit. The frame may be the top portion of the package or the bottom portion of the package. The lifting frame may be adapted to secure the modules for transport. It also may be adapted to support and restrain a section of hose during testing. As a hose support, it can be used with stands as well.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present invention is directed to systems and methods which facilitate inspection, maintenance, and revalidation or recertification of hoses with improved portability, safety, and efficiency. This process will be referred to herein as IMR (standing for Inspection, Maintenance, and Revalidation or Recertification). The present invention provides test units comprised of individual components which can be easily assembled into a transportable package to ship to customer sites such as offshore platforms, ships, ship yards or other onshore locations. The invention provides improvements in test flexibility, system portability, environmental safety and overall efficiency.

Figure 1:
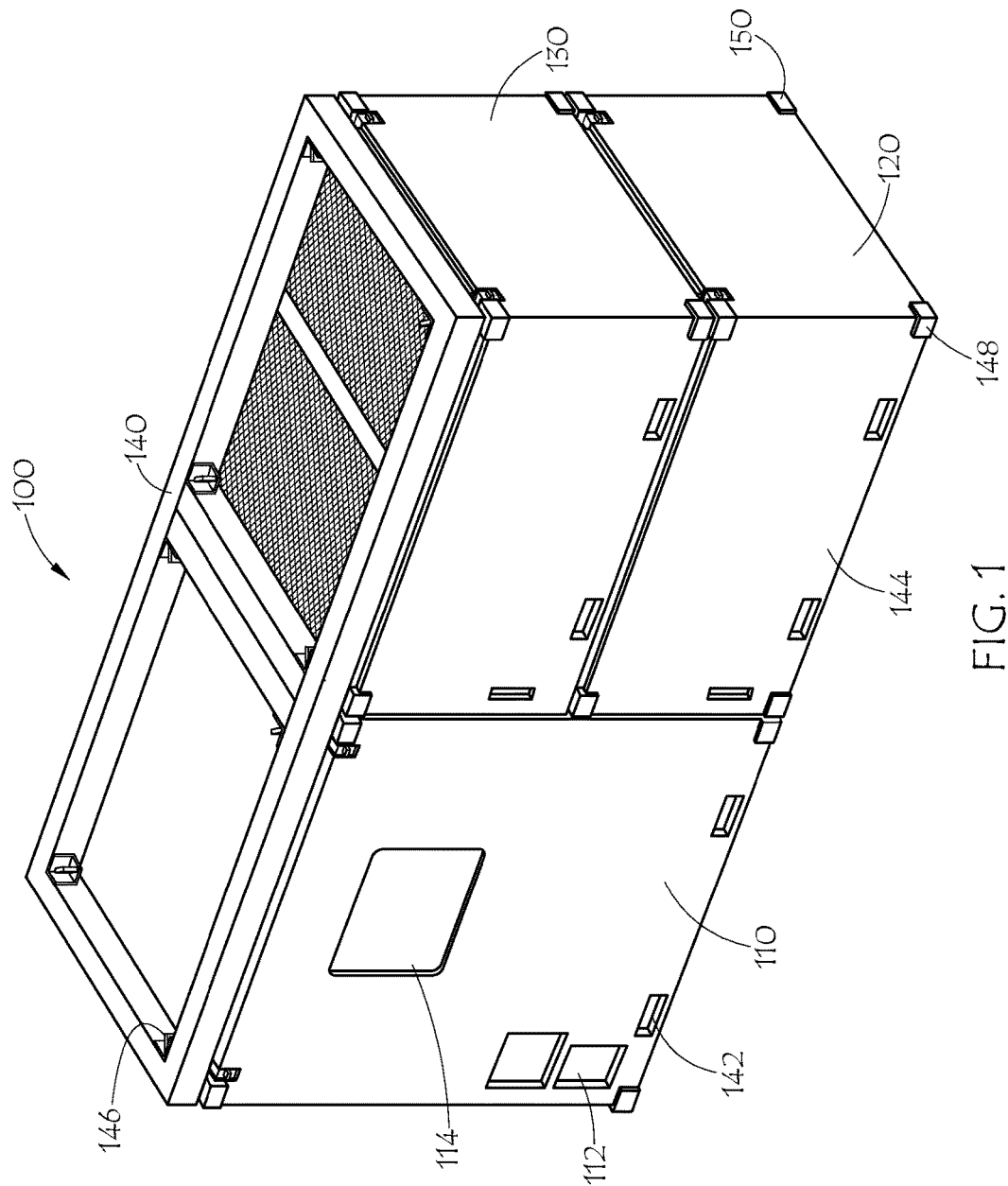
FIG. 1 is a perspective view of a hose test system according to an embodiment of the invention assembled for transport.
Figure 2:
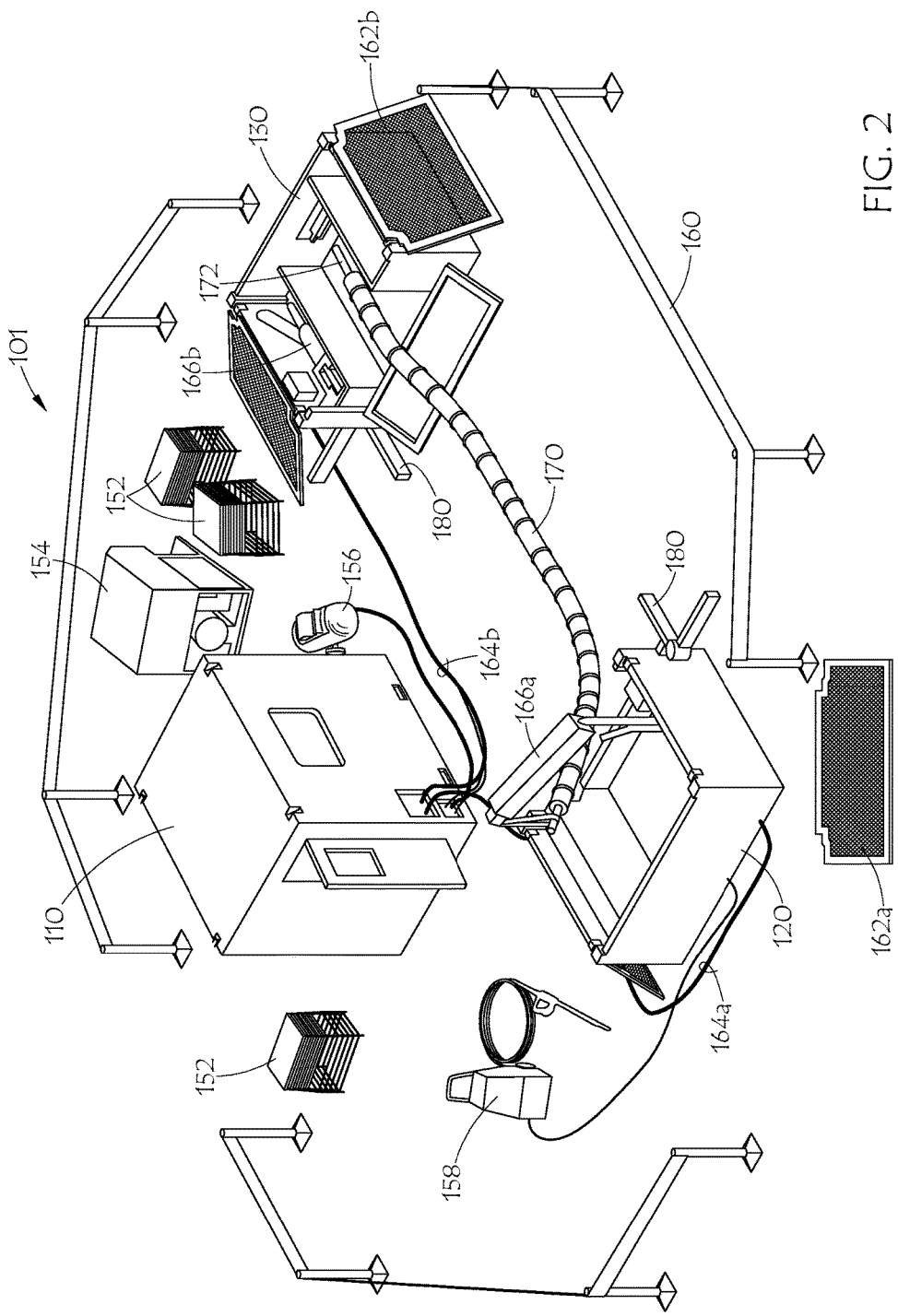
FIG. 2 is a perspective view of the hose test system of FIG. 1 in use according to an embodiment of the invention.
Figure 3:
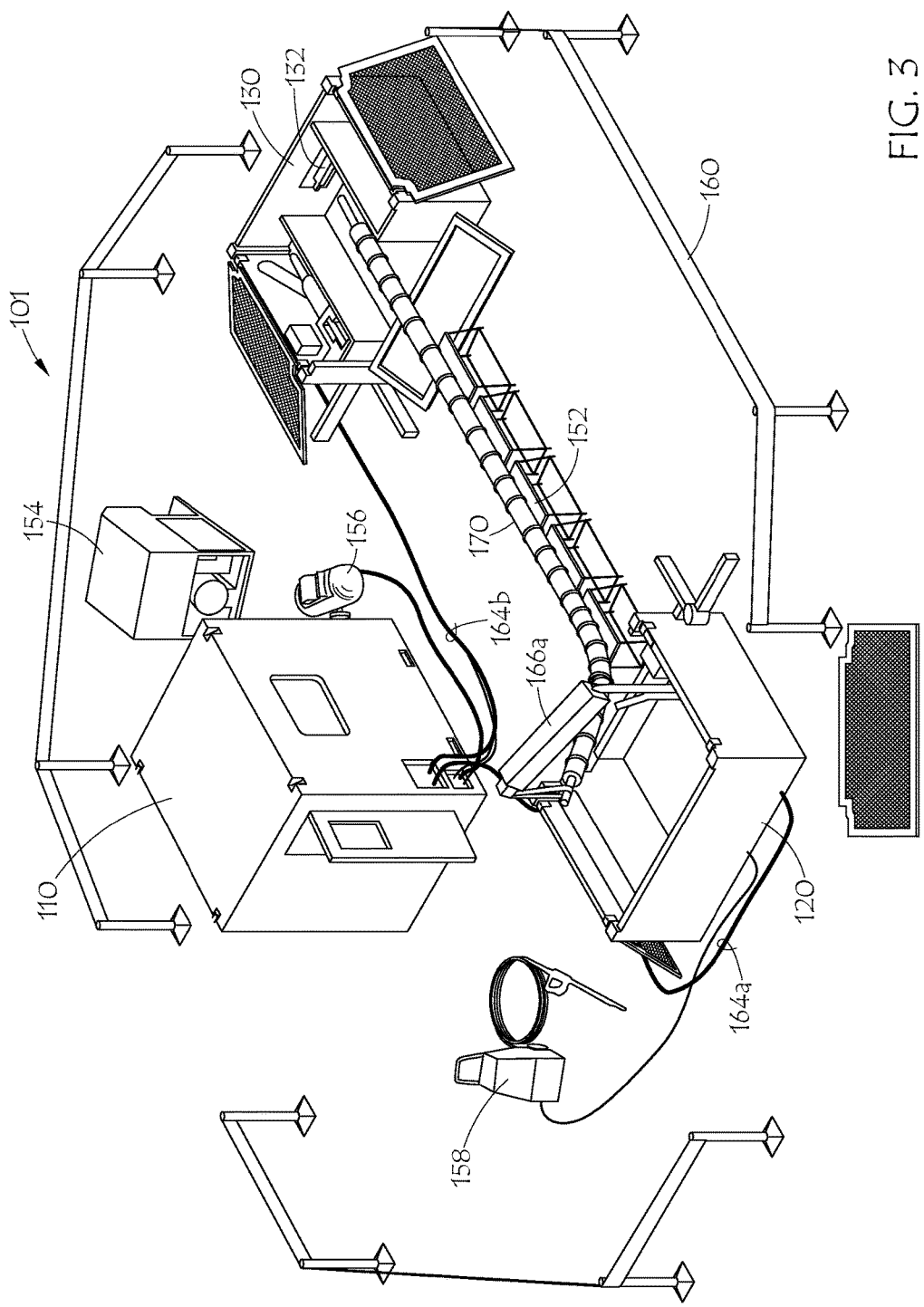
FIG. 3 is another perspective view of the hose test system of FIG. 1 in use according to another embodiment of the invention.

FIGS. 1-3 illustrate a first embodiment of the invention. FIG. 1 shows a test system 100 assembled into a containerized package for easy portability. FIGS. 2 and 3 show the system of FIG. 1 in two representative uses. The major components of the package in are the control module 110 and the first IMR test module 120 and the second IMR test module 130. Also shown is a lifting frame 140 on the top portion of the assembled package. Thus the unitary package may have an external lifting interface for moving and/or securing. The interface could include one or more selected from a padeye, a shackle, a fork pocket, a tugger point, and a complete lifting set. FIG. 1 shows fork pockets 142 located in bottom rail 144, as well as crane hooks 146 and corner reinforcements 148 and tugger points 150. The test modules may have fasteners, such as DNV rated twist locks, which permit assembly into a unitary package of predetermined overall dimension (i.e. size and shape). The transportable test system may have a predetermined overall dimension (i.e. size and shape) which may be that of a standard shipping container. DET NORSKE VERITAS ("DNV") is an autonomous and independent Foundation with the object of safeguarding life, property and the environment at sea and ashore. By standard shipping container is meant any of the so-called intermodal containers also referred to as freight container, ISO container, shipping container, hi-cube container, conex box and sea can, which are basically a standardized reusable steel box used for moving goods by ship, rail, or truck in a global containerized intermodal freight transport system. There are various applicable standards, so such containers may range in length from about 8 to 56 feet (about 2.4 to 17 m) and in height from 8 feet (about 2.4 m) to 9 feet 6 inches (about 2.9 m) and have a width of about 8 feet (about 2.4 m) or 7 to 8 feet (2.1-2.4 m) (as may the inventive test system containerized package).

The control module functions as a safe chamber for the testing personnel during pressurization and stabilization of the hose. The control module may house the requisite pressure generation and filtration equipment for the hose testing. The control module may have a service panel 112 which provides external connection points for electricity, pressurized air, high-pressure test fluid, low-pressure water, data communication lines, and the like. The control module may have two service panels, one dedicated to each of the two IMR test modules. The control module houses a test control system. The test control system is adapted to implement a predetermined test protocol which can include carrying out a desired hose pressurization schedule with defined pressurization ramp(s) and level(s), leak detection, and recordation of test data and reporting of the data and results. The control system may include a computer with data storage and output capability or other automatic data processing equipment capable of controlling a test, measuring the required test parameters and performing data recording and reporting functions. Reporting may include a chart recorder, printer, graphical display device, or the like. The control system may also include or interface with any desired non-destruction test useful for hose revalidation, such as an ultrasonic tube tester. Leak detection may include pressure decay monitoring. A typical maximum test pressure may be e.g. 120% of the rated working pressure of the hose under test.

A first IMR test module may have a clean fluid provider and/or supply reservoir, and a second IMR test module may have a used fluid collector and/or collection reservoir.

In use, the two IMR test modules 120 and 130 are set apart in accordance with the length of hose 172 to be tested, as shown in FIGS. 2 and 3. The test system is surrounded or at least partially surrounded with safety cordoning 160 to indicate to personnel where high pressure test activity might be in progress. The hoses typically requiring revalidation testing in off shore oil field use might by up to 200 feet or more in length, many inches in diameter, rated for many thousands of psi in working pressure, and therefore quite heavy and potentially dangerous if they were to rupture or become free during testing. The inventive test system and methods are therefore designed to minimize the risk of injury to test personnel and anyone else in the vicinity of the testing. The safety cordoning may be stored in the control module during transport of the system.

The test modules include a fluid containment subsystem or capability, i.e. fluid collection apparatus, collection and supply reservoirs, drains, associated piping and valves, and the like. Preferably, a first IMR test module 120 stores and provides clean fluid(s) for testing and cleaning use, while a second IMR test module 130 receives and stores used test fluid and/or cleaning fluid. The test modules may include a tapered or funnel-like surface, with a hole so that water collects and falls through the hole into a reservoir below. Water (or other fluid) can be then drawn from the reservoir to either supply either the high pressure test unit or the washer unit, or drained out for further use, treatment or disposal.

Figure 8:
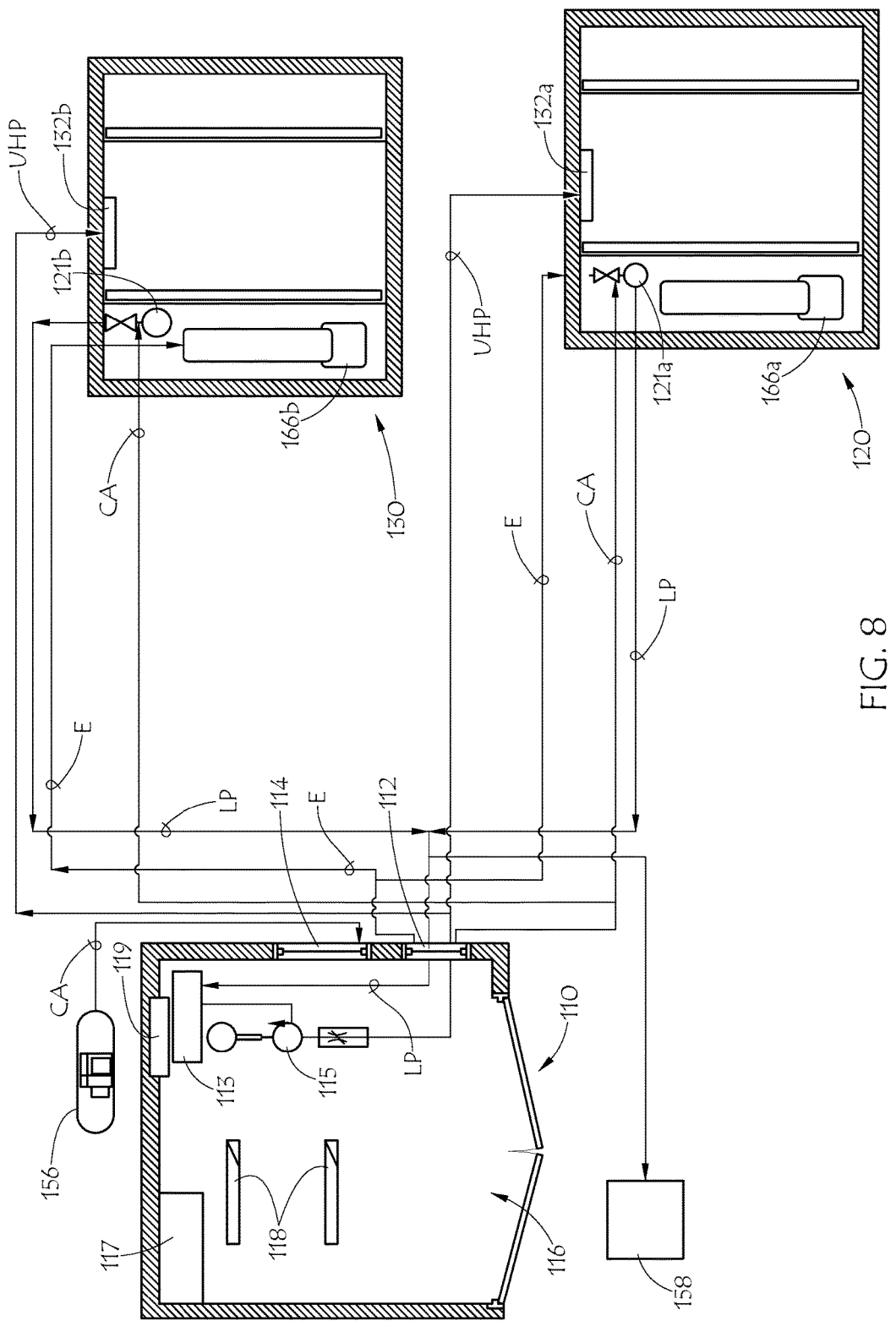
FIG. 8 is a flow diagram for an embodiment of the invention.

The system includes a pressurization subsystem which provides pressurized test fluid to the hose to be tested. A fluid flow diagram according to one embodiment of the invention is shown in FIG. 8. The first IMR test module includes a clean fluid reservoir. A pumping system is housed in the control module. The pumping system may be connected to the reservoir through a low pressure hose which connects between appropriate service panels on the control module and the first IMR test module. The pumping system is then connected with high pressure hose between the control module and the manifold on one of the IMR test modules via appropriate service panel connections. Note that the flow system could be arranged to provide the high pressure test fluid to either one of the manifolds. In the embodiment shown in FIG. 8 the high pressure test fluid may be pumped to either IMR test module and its manifold. Spent or used test fluid may be then drained into the storage or collection reservoir for dirty fluid on the second IMR test module via appropriate piping and valves. The pumping system could include a pump, filtration, piping and valves, and the like.

FIG. 8 shows in more detail one possible flow diagram for a test system according to an embodiment of the invention. In FIG. 8, a number of abbreviations are used. UHP stands for ultra-high pressure water lines. LP stands for low pressure water lines. E stands for electrical lines. CA stands for compressed air lines. FIG. 8 shows one possible flow and services arrangement between the control room module and two IMR test modules. The control room 116 in control module 110 is shown with air conditioning 117, fluorescent lights 118, a fuse box 119 and a window 114. Other features for comfort and utility would of course be considered within the scope of the invention. The primary elements of the pressurization system are show as a UHP water pump 115 housed in the control room, a low pressure diaphragm pump 121*a* and 121*b* housed in each test module, and a manifold 132*a* and 132*b* in each test module. These elements are connected by suitable hoses to complete the necessary flow circuits. There is an air compressor 156 supplying compressed air (CA) to the diaphragm pumps. Other types of pumps and/or pump power sources could be used. There is shown a header tank 113 which feeds water to the high pressure pump 115. The header tank may be supplied from a supply reservoir in one of the test modules, or from a collection reservoir in one of the test modules. The high pressure water may be supplied to either manifold, although the test system need only have one of the manifolds supplied by UHP water. The test hose(s) may be connected between the two manifolds or connected to one manifold and the other end capped off. FIG. 8 also shows electric supply lines (E) to run the cranes. These may be any desired voltage and may also run electric pumps instead of air pumps. The low pressure water lines (LP) are also shown supplying an optional water washer which may be used to wash off the test hoses. The various lines are shown passing through a bulkhead 112 in the side wall of the control room module. This is equivalent to the service panel 112 mentioned above. The lines may pass through or be removably connected to suitable bulkhead fittings. The various lines may be housed in an umbilical line. The lines may be disconnected from the modules and stored in one or more of the modules for transport.

The test system may be adapted to test multiple hoses at once. There may be a manifold in each IMR test module, with multiple hose connections. There may be relatively short jumper hoses that go from the manifold to the ends of the test hoses. The manifolds, for example, may be designed to accommodate two to four hoses. Thus, provided the hoses are a similar length and require the same test procedure, the inventive test system can run multiple hose tests simultaneously.

Hose stands 152 may also be provided to ease cleaning, improve handling and ergonomics, to support the test hose, and to help drain fluids into test chambers during and after cleaning and after testing. The hose stands may vary in height so that the test hose may be supported in a sloped manner to facilitate draining of the test fluids towards the fluid collection apparatus and reservoir in the second IMR test module. The hose stands may be stackable for easy storage and handling. The hose stands may be adjustable and/or lockable into specific positions. The hose stands may be stored in the control module or in one or more of the IMR test modules during transportation of the system as a unitary package.

The test modules may have an integrated hose lifting subsystem for easier and safer manipulation of test hoses before, during, and after testing. The hose lifting subsystem may include integrated crane(s) mounted on the IMR test module(s) for easier and safer manipulation of hoses. FIG. 2 shows a crane 166*a* extended and lifting one end of the test hose on the first IMR test module 120. The hose end may be lifted to facilitate purging air from the hose when filling with test fluid, or for draining water from the hose after cleaning the inside or after pressurized testing is completed. The crane 166*b* shown on the second IMR test module 130 is in the collapsed position for storage and transporting.

Figure 4:
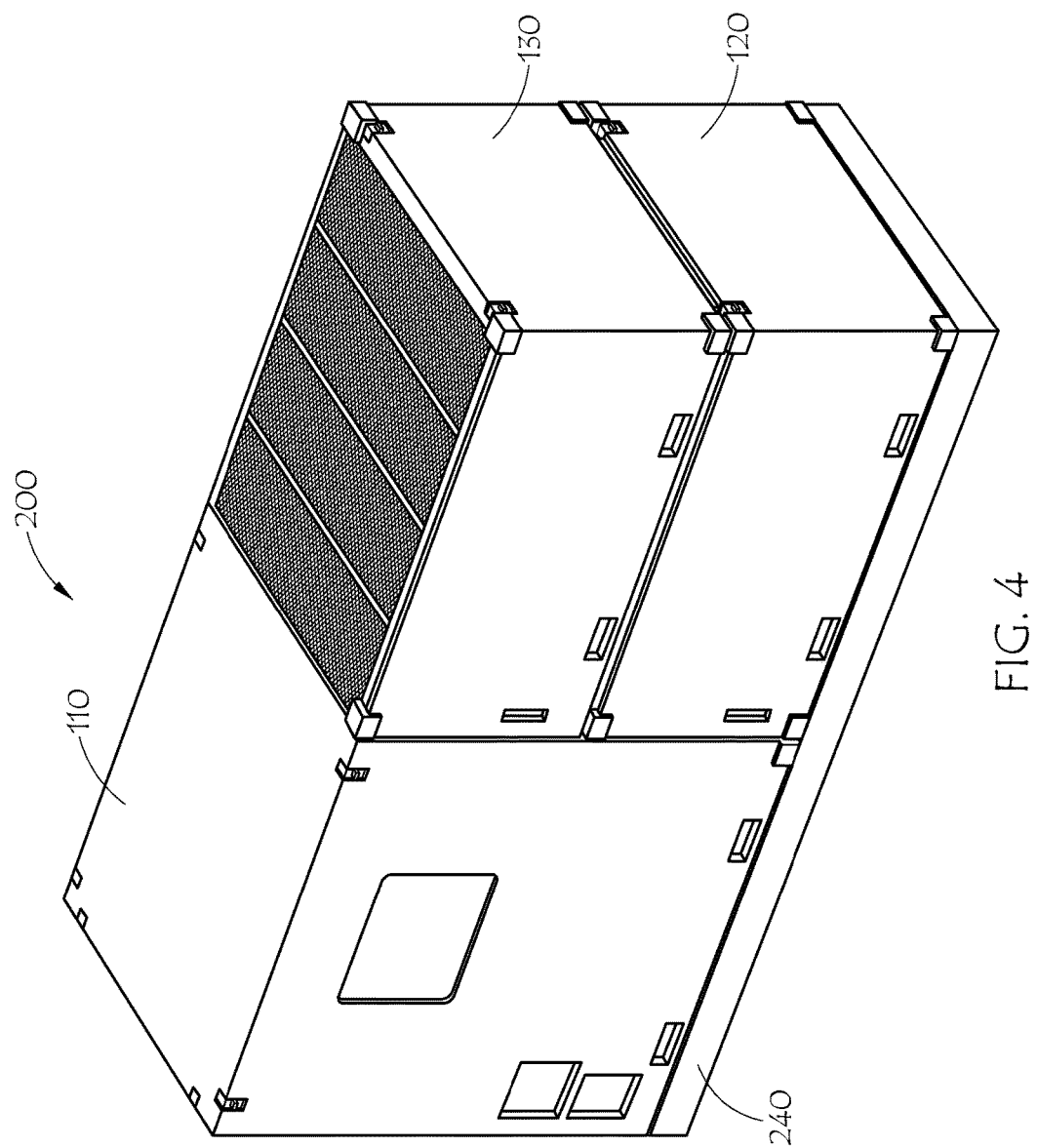
FIG. 4 is a perspective view of a hose test system according to another embodiment of the invention assembled for transport.
Figure 5:
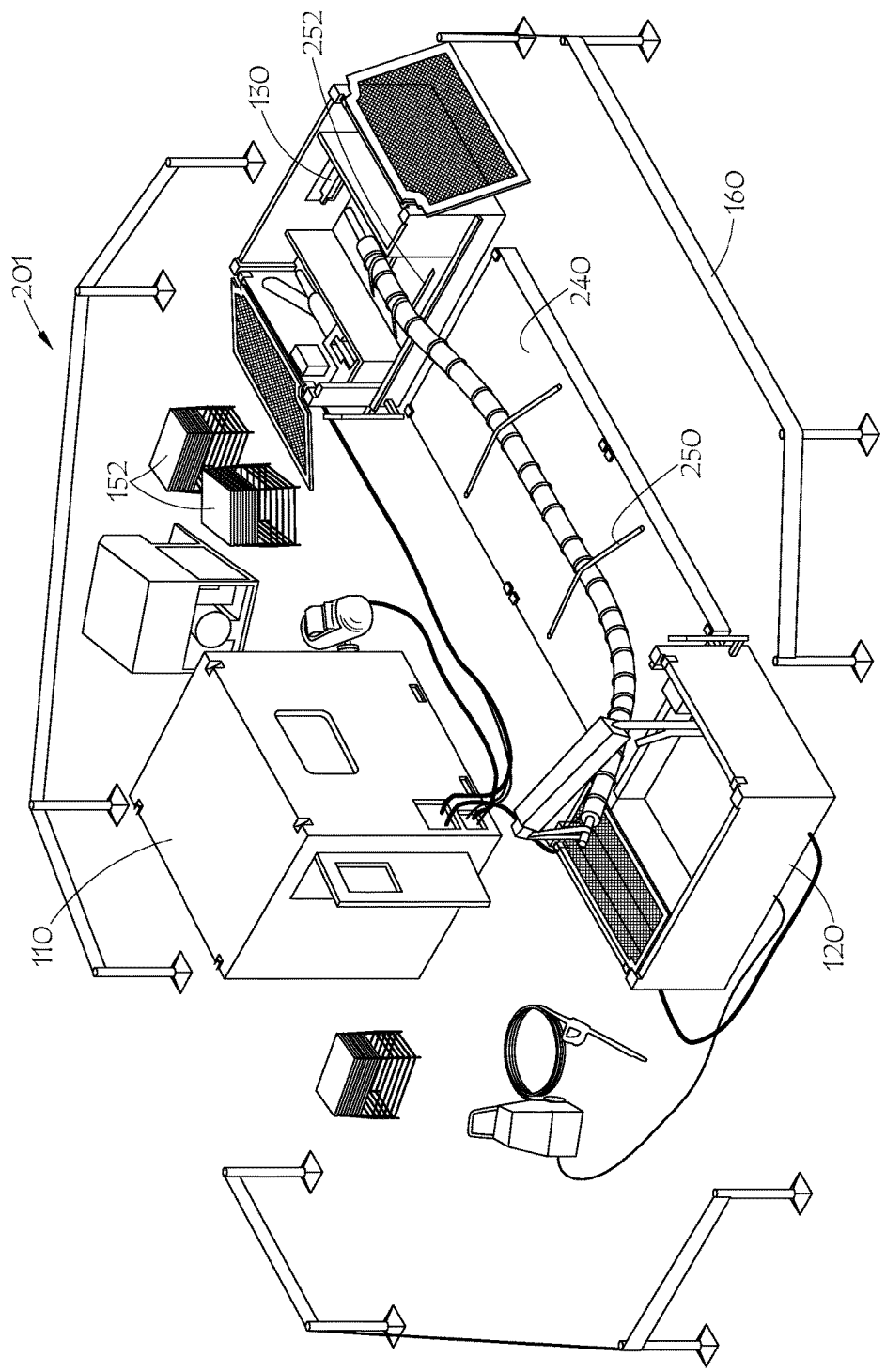
FIG. 5 is a perspective view of a hose test system the hose test system of FIG. 4 in use according to an embodiment of the invention.

The hose-test system may include a hose restraint subsystem. Hoses may be shackled, chained, tethered, or otherwise restrained to the IMR test modules at each end of the hose during testing. Such restraining is to prevent whipping of the hose end should it rupture during high-pressure testing. Any known suitable anti-whip or whip-check device(s) may be used. The IMR test modules may also include suitable hatch covers to block shrapnel or other projectiles that might be produced and thrown out during a catastrophic hose failure. The burst protection hatch covers shown in the figures are illustrated as steel mesh covers on each test chamber module. The covers 162*a* and 162*b* may be hinged and/or removable. In the embodiment of the invention, hose test system 200 shown packaged in FIG. 4 and corresponding in-use system 201 in FIG. 5, the lifting frame 240 is used as a bolster or support and restraint for the middle section of the test hose. Tethering 250 of the hose to the bolster/lifting frame 240 is shown in FIG. 5 in order to prevent movement thereof.

The hose test system may include a cleaning subsystem. The cleaning subsystem can include a cleaning fluid reservoir, pump, filter, hose, and nozzle for washing the hose. The cleaning subsystem can be a power washer 158. The power washer can be stored in the control module during transport of the system.

The hose test system may include stabilizer and mobilizer subsystems. A stabilizer subsystem is shown in FIGS. 2, 3, and 5 as extendable legs 180 located at the corners of the IMR test modules. The legs may be retracted in the modules during transport, or extended and adjusted (for example, with adjustable feet) to stabilize and/or level the module. A mobilizer subsystem, not shown, may include attachable and/or detachable wheels which mount on legs of the stabilizer system to make the test modules easily movable. The mobilizer subsystem could be wheels or casters on the test modules. The wheels could be disengaged to stabilize the test modules by activating the legs. Alternately, the wheels could be retractable or removable.

Figure 7:
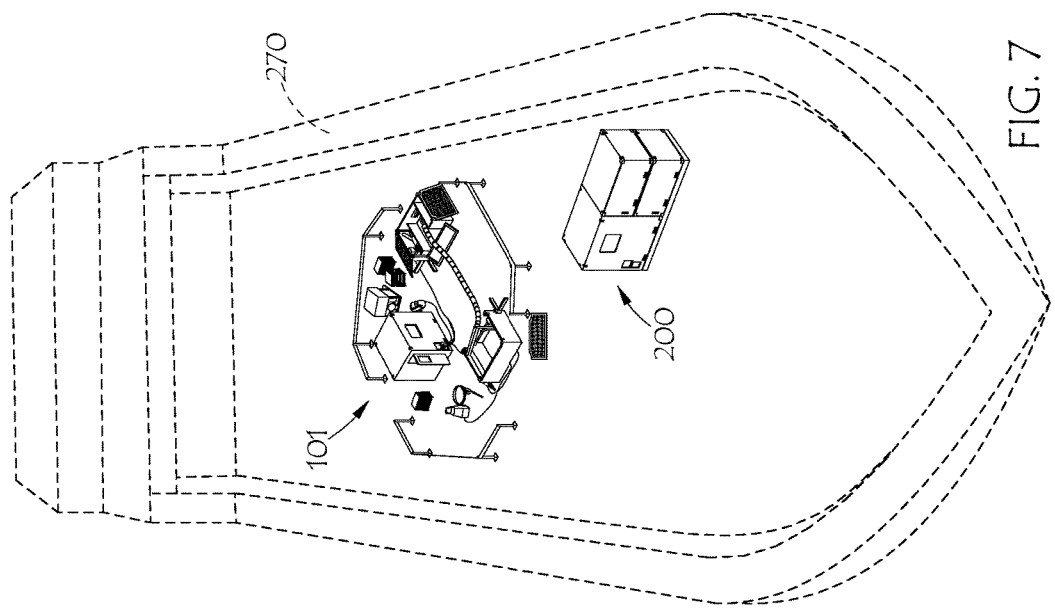
FIG. 7 is a perspective view of a hose test system in use onboard a ship according to an embodiment of the invention.
Figure 6:
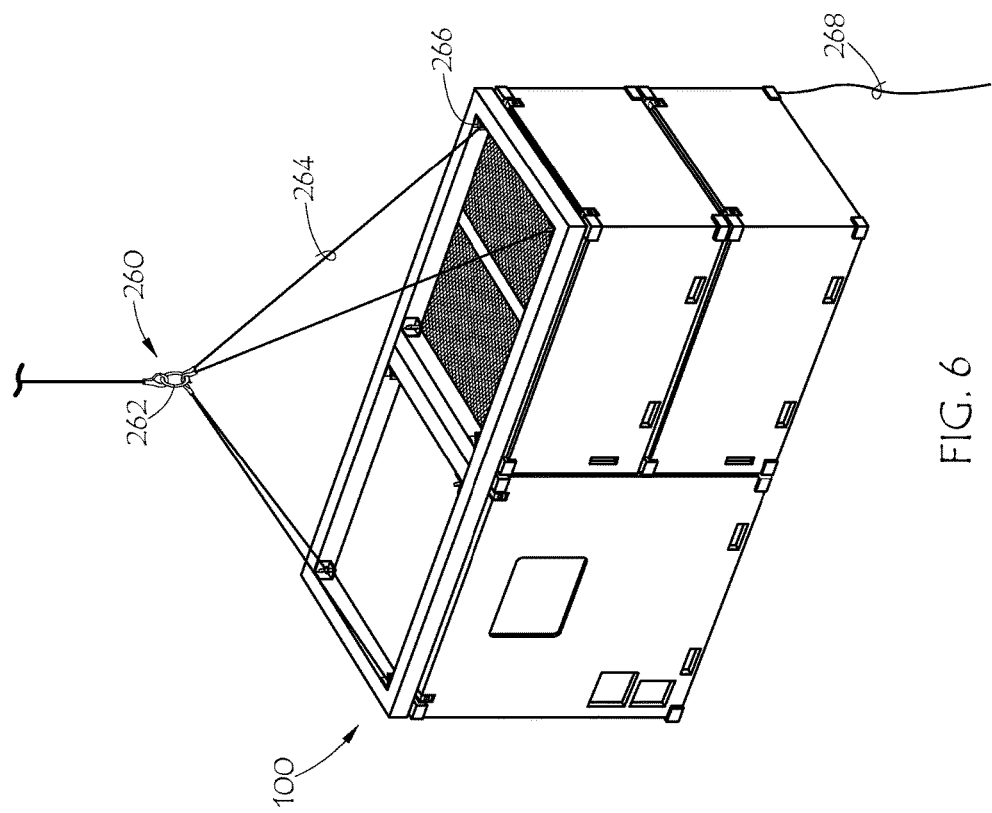
FIG. 6 is a perspective view of a hose test system according to an embodiment of the invention being transported as a shipping container.

The transportable hose-test system 101, 201 also may include a lifting frame 140, 240 for mobilization and transport of the units. The lifting frame assembles with the control and test modules into a unitary package 100, 200 and thus secures the modules for transport. The lifting frame includes attachment sites for lifting the test system package as a unit. The lifting frame 140 may be the top portion of the package as shown in FIG. 1, or the lifting frame 240 may be the bottom portion of the package as shown in FIG. 4. The lifting frame may also be adapted to support and restrain a section of hose during testing as shown in FIG. 5. The lifting frame shown in FIG. 5 could also be used with the hose stands 152 if desired. The lifting frame could also be used to assemble 2 or more individual units to be mobilized as one ISO container for regular shipping, logistical compliance, and movement. In the figures as shown, the control module is dimensioned as a 10-foot shipping container and the two IMR test modules are dimensioned as 10-foot, ½-height, shipping containers. Thus, the lifting frame assembles with a control module and two IMR test modules to form one 20-foot ISO container. Alternately, the frame could handle transportation of two control modules or four IMR test modules. A 40-foot lifting frame could handle two complete hose-test systems including two control modules and four test modules. All modules and assembled systems may be compliant with DNV 2.7-2 certification for use in offshore transportation systems and applications. FIG. 6 illustrates a test system package 100 being lifted as a single container by a helicopter or crane using a standard lifting set 260 comprising four sling legs 264 connected at a master link 262 and shackled 266 to the lifting frame, with guide line 268 for guiding and/or orienting the container. FIG. 7 illustrates the transportable hose-test system 101 in use on the deck of a drilling ship 270 and a second packaged system 200 residing nearby. Alternatively, the individual modules may be transported without the lifting frame. Thus, for example, the control module may be transported as a 10-foot container alone, and each of the 2 half-height test modules may be transported separately or joined to form another 10-foot container.

The fluid containment subsystem may include a blanket 170 which may be laid underneath the test hose 172 along its length or wrapped loosely around it. The blanket when laid flat under the hose, and possibly in conjunction with the hose stands 152, may collect wash water and then facilitate draining of the external wash water back to one of the reservoirs contained in the test modules. The blanket 170 in its wrapped configuration, as shown in FIGS. 2 and 3, may also contain leaks during the hose testing and again facilitate draining of the leaked fluid or water back to one of the reservoirs contained in the test modules. The blanket 170 may also contain fluid and or hose parts should the hose rupture during test.

What follows is a description of the testing process or method. The methods, according to embodiments of the invention, may include various combinations of some or all of the following steps.

The test hose(s) may be cleaned thoroughly from the outside and inspected for damage, corrosion, fatigue or degradation. This step may utilize the cleaning subsystem described above. Some minor external hose repair could possibly be done.

The test hose(s) may be cleaned thoroughly on the inside and inspected for damage, corrosion, fatigue or degradation. Internal inspection may utilize a flexible borescope, push camera, pipe scope or snake scope (i.e. an industrial endoscope) with appropriate lighting, lens and length and camera or other data recording or viewing apparatus suitable for the application. This step may also use the cleaning subsystem and/or non-destructive testing methods for crack or flaw detection such as the ultrasonic method mentioned above.

If the test hose(s) are free of significant damage, corrosion, fatigue or degradation then the revalidation process moves on to pressure testing to test for hose and coupling integrity. Should significant damage to the hose or couplings be observed during inspecting a hose can be failed before pressure testing.

The hose is then restrained by shackling and chaining the hose ends to their respective IMR test modules as shown in FIG. 5. The hose ends are connected to the IMR test modules via manifolds, hose connectors and/or jumper hoses. Any additional anti-whip or whip checking devices may be applied at this time. The test hose(s) may also be supported and/or restrained on a flat, platform-like lifting frame 240 which is also functional to assemble the test modules into a containerized package for transportation of the system as shown in FIG. 5, with tethers 250 and hose-end restraints 252. The test hose(s) may also be supported on one or more hose stands 152 as shown in FIG. 3. The hose stands may be stackable as shown in FIGS. 1 and 2 and may be of various heights to provide slope to the test hose to facilitate draining or filling. One or more of the hatch covers 162*a* and 162*b* on the IMR test modules may be closed for safety for example during pressurization.

The hose(s) are then filled with test fluid and pressurized to a specified or predetermined pressure and held for a predetermined duration as determined by the manufacturer's or a certification standard's guidelines. The control system implements the specified ramp rates and pressure levels. Water is a preferred test fluid, but other test fluids could be used instead of water if desired.

The test hose(s) are held at a specified pressure for a specified amount of time. This can be as short as 20 minutes or less, or as long as 24 hours or more. The test hoses are monitored continuously by the control system while and after they are pressurized. Hoses are failed if they are not able to hold pressure for the amount of time specified by the manufacturer.

In all cases, but particularly the cases where hoses are left pressurized over night, it should be ensured that access to the hoses is limited to trained or designated personnel. The safety cordoning described above is helpful limit access. The test may be safely observed from inside the control module with viewing through a window provided therein.

Upon successful completion of the pressure test, the pressure is released and fluid is emptied out of the hose into the fluid collection apparatus and reservoir of the second IMR test module. Draining of the hose(s) may include lifting one end of the hose(s) with a crane integrally mounted on one of the IMR test modules, preferably on the first module which contains the clean test fluid reservoir. The used test fluid may then drain into the second IMR test modules spent fluid reservoir.

A test report is generated and/or printed incorporating the data from the recorded from the pressurization test as well as inspection information. The report validates or certifies that the hose has passed the test and may be suitable for continued use. Generally recertification/revalidation does not promise any further warranty on the hose tested The advantages of the present invention are many. The equipment can be used according to work instructions for safe testing, and the specialized equipment facilitates implementing a strong HSE (Health, Safety, and Environment) strategy. It is also possible to attain better consistency for the testing procedures with the automatic data recording and report generation. Test stands and lifting equipment improves hose handling and ergonomics resulting in safer operations. Hoses are shackled and restrained to the test chambers to prevent whipping in the event of hose failure. Burst protection makes the testing area safer for personnel. Fluid containment systems prevent environmental contamination.

Many limitations of the conventional process are resolved or improved by embodiments of the present invention. Report writing is accelerated by the computerized control system. Hoses no longer need lie on the ground, keeping them cleaner and less likely to become dirty or damaged. The fluid used for cleaning and pressuring the hoses can now be collected instead of escaping into the environment around the testing area. Hose ends may be constrained in a much safer manner during testing. If a coupling fails or a hose end bursts, the hose end can be kept from whipping around and possibly damaging equipment or endangering personnel. Testing no longer need rely on people lifting and manipulating the hose by hand. As noted elsewhere, the hose ends can be very heavy. The inventive testing methods and associated equipment are now better suited to an offshore environment than previous conventional test setups. The containerized test system can be transported to a remote site and used in more space-limited environments.

The test system described herein could be used on a wide variety of hoses, or other tubular products or fluid conduits, including tubes and hoses with different kinds of reinforcements, tube or cover materials, designed for a wide variety of applications. The tested hose could for example be hydraulic hose, a mud pumping hose, a flow line or fluid transport hose, an umbilical or tube which contains other tubes, wiring, and so on.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A transportable test system for Inspection, Maintenance, and Revalidation (i.e., IMR) of a test hose comprising:
    a control room module;
    a first IMR test module with a clean fluid provider; and
    a second IMR test module with a used fluid collector; and
    wherein said control room module and said two IMR test modules comprise fasteners that permit assembly into a unitary package of predetermined overall size and shape of a standard shipping container.

2. The transportable test system of claim 1 wherein said fasteners comprise twist locks.

3. The transportable test system of claim 1 wherein said unitary package comprises an external lifting interface for moving and/or securing the unitary package.

4. The transportable test system of claim 3 wherein said lifting interface comprises one or more selected from a padeye, a shackle, a fork pocket, a tugger point, and a standard lifting set.

5. The transportable test system of claim 3 wherein said lifting interface comprises a lifting frame which together with said control room module and two test modules forms said unitary package with said predetermined size and shape of a standard shipping container.

6. The transportable test system of claim 1 further comprising a hose pressurization subsystem.

7. The transportable test system of claim 6 wherein said hose pressurization subsystem comprises one or more of a compressor or pump for pressurizing, filtration apparatus, individual test hose hook up, and a manifold for multiple test hoses.

8. The transportable test system of claim 7 wherein said hose pressurization subsystem is housed in one or more of said modules.

9. The transportable test system of claim 1 further comprising a cleaning subsystem.

10. The transportable test system of claim 9 wherein said cleaning subsystem comprises one or more of a pump, filter, hose, nozzle and a power washer.

11. The transportable test system of claim 10 wherein said cleaning subsystem is housed in one of said modules for transport of the system.

12. The transportable test system of claim 1 further comprising a fluid containment subsystem.

13. The transportable test system of claim 12 wherein said fluid containment subsystem comprises fluid collection apparatus and a reservoir housed in one or more of said IMR test modules.

14. The transportable test system of claim 1 further comprising a hose lifting subsystem.

15. The transportable test system of claim 14 wherein said hose lifting subsystem comprises at least one of one or more hose stands and a crane housed in or mounted on one or both of said IMR test modules.

16. The transportable test system of claim 15 wherein said hose stands are of varying or adjustable height and are stackable.

17. The transportable test system of claim 5 further comprising a hose restraint subsystem for restraining a test hose.

18. The transportable test system of claim 17 wherein said hose restraint subsystem comprises one or more of shackles, tethers, chains, an anti-whip or whip-check device for one or both ends of the test hose, and wherein the lifting frame is configured to restrain and support a length of the test hose during IMR testing.

19. The transportable test system of claim 1 further comprising a control system housed in said control room module and adapted to implement a predetermined test protocol including carrying out a hose pressurization schedule, leak detection, and test report generation.

20. The transportable test system of claim 1 wherein said modules are each transportable as a standard shipping container.

21. The transportable test system of claim 1 wherein each of said IMR test modules comprise a stabilizer subsystem and a mobilizer subsystem.

22. The transportable test system of claim 21 wherein said stabilizer and mobilizer subsystems comprise extendable legs with leveling jacks and wheels.

23. The transportable test system of claim 1 further comprising a frame that facilitates assembly of said modules into said unitary package, said frame including attachment sites for lifting said package as a unit.

24. The transportable test system of claim 23 wherein said frame is adapted to support and restrain a section of hose during testing.

25. The transportable test system of claim 23 wherein said frame assembles with said modules as the top portion of the unitary package.

26. The transportable test system of claim 23 wherein said frame assembles with said modules as the bottom portion of the unitary package.

27. A method of testing a hose comprising:
cleaning said hose;
inspecting said hose;
connecting said hose between two IMR test modules at least one of which is fluidically connected to a high pressure fluid source and a control room module;
restraining each hose end to a respective one of said test modules;
pressurizing said hose with a test fluid according to a predetermined test protocol;
detecting leaks from said hose if present; and
draining said test fluid from said hose into a reservoir housed in one of said test modules;
wherein said control room module and said two IMR test modules comprise fasteners that permit assembly into a unitary package of predetermined overall size and shape of a standard shipping container.

28. The method of claim 27 wherein said pressurizing comprises pumping said test fluid from a supply reservoir in one of said test modules into said test hose via a high-pressure pump housed in a control module.

29. The method of claim 28 wherein said control module further houses a computer which carries out said test protocol, implements a leak detection routine, and generates a report of the test results.

30. The method of claim 29 wherein said control module, and said two test modules assemble, with a lifting frame, to form a transportable, standard shipping container.

* * * * *